(12) United States Patent
Yoo et al.

(10) Patent No.: US 10,700,830 B2
(45) Date of Patent: Jun. 30, 2020

(54) TECHNIQUES FOR CONVEYING IDENTIFICATION INFORMATION IN A PREAMBLE TRANSMISSION

(71) Applicant: QUALCOMM Incorporated, San Diego, CA (US)

(72) Inventors: Taesang Yoo, Riverside, CA (US); Siddhartha Mallik, San Diego, CA (US); Arumugam Chendamarai Kannan, San Diego, CA (US); Tao Luo, San Diego, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/847,308

(22) Filed: Sep. 8, 2015

(65) Prior Publication Data

US 2016/0112168 A1 Apr. 21, 2016

Related U.S. Application Data

(60) Provisional application No. 62/066,550, filed on Oct. 21, 2014.

(51) Int. Cl.
*H04L 5/00* (2006.01)
*H04W 16/14* (2009.01)
(Continued)

(52) U.S. Cl.
CPC ......... *H04L 5/0048* (2013.01); *H04B 7/2656* (2013.01); *H04L 5/14* (2013.01); *H04W 16/14* (2013.01); *H04W 74/008* (2013.01)

(58) Field of Classification Search
CPC . H04W 74/002–008; H04W 28/18–26; H04W 72/048; H04W 72/02
See application file for complete search history.

(56) References Cited

U.S. PATENT DOCUMENTS

| 5,655,215 A | 8/1997 | Diachina et al. |
| 6,625,172 B2 | 9/2003 | Odenwalder et al. |

(Continued)

FOREIGN PATENT DOCUMENTS

| CN | 1697438 A | 11/2005 |
| CN | 101127562 A | 2/2008 |

(Continued)

OTHER PUBLICATIONS

ISA/EPO, International Search Report and Written Opinion of the International Searching Authority, Int'l App. No. PCT/US2015/049191, Nov. 17, 2015, European Patent Office, Rijswijk, NL, 12 pgs.

*Primary Examiner* — Marcus Smith
(74) *Attorney, Agent, or Firm* — Holland & Hart LLP

(57) ABSTRACT

Techniques are described for conveying identification information in a preamble transmission. A transmission burst may be generated for transmission over a wireless medium. The transmission burst may include the preamble and a body portion. The preamble may include identification information associated with at least one of a transmitting device or a category of data bring transmitted. The transmission burst may then be transmitted over the wireless medium.

15 Claims, 13 Drawing Sheets

(51) Int. Cl.
  *H04W 74/00* (2009.01)
  *H04L 5/14* (2006.01)
  *H04B 7/26* (2006.01)

(56) References Cited

U.S. PATENT DOCUMENTS

| | | | |
|---|---|---|---|
| 7,411,898 B2 | 8/2008 | Erlich et al. | |
| 8,599,706 B2 | 12/2013 | Damnjanovic et al. | |
| 2005/0111449 A1* | 5/2005 | Moorti | H04B 1/38 |
| | | | 370/389 |
| 2005/0265220 A1 | 12/2005 | Erlich et al. | |
| 2007/0072600 A1 | 3/2007 | Cho et al. | |
| 2008/0039107 A1* | 2/2008 | Ma | H04B 7/02 |
| | | | 455/450 |
| 2011/0128929 A1 | 6/2011 | Liu et al. | |
| 2011/0165834 A1 | 7/2011 | Hart et al. | |
| 2014/0376483 A1* | 12/2014 | Hong | H04W 72/048 |
| | | | 370/329 |
| 2015/0156760 A1* | 6/2015 | Yu | H04W 4/005 |
| | | | 370/330 |
| 2015/0208350 A1* | 7/2015 | Li | H04W 72/048 |
| | | | 370/336 |
| 2015/0289292 A1* | 10/2015 | Sun | H04W 74/0833 |
| | | | 370/329 |
| 2016/0255616 A1* | 9/2016 | Martin | H04W 72/048 |
| | | | 370/330 |
| 2016/0278129 A1* | 9/2016 | Lopez-Perez | H04W 48/00 |
| 2016/0295503 A1* | 10/2016 | Bucknell | H04W 74/006 |
| 2017/0078058 A1* | 3/2017 | Marinier | H04L 5/0044 |
| 2017/0245308 A1* | 8/2017 | Morioka | H04W 72/1268 |

FOREIGN PATENT DOCUMENTS

| | | |
|---|---|---|
| EP | 1179898 A2 | 2/2002 |
| EP | 1890445 A2 | 2/2008 |
| JP | 2000181822 A | 6/2000 |
| JP | 2003101554 A | 4/2003 |
| JP | 2008072706 A | 3/2008 |
| JP | 2008252889 A | 10/2008 |
| JP | 2013513309 A | 4/2013 |
| WO | WO-02089432 A1 | 11/2002 |
| WO | WO-2008042967 A2 | 4/2008 |
| WO | WO-2011068985 A1 | 6/2011 |

* cited by examiner

TECHNIQUES FOR CONVEYING IDENTIFICATION INFORMATION IN A PREAMBLE TRANSMISSION

CROSS REFERENCES

The present application for Patent claims priority to U.S. Provisional Patent Application No. 62/066,550 by Yoo et al., entitled "Techniques for Conveying Identification Information in a Preamble Transmission," filed Oct. 21, 2014, assigned to the assignee hereof, and expressly incorporated by reference herein.

BACKGROUND

Field of the Disclosure

The present disclosure, for example, relates to wireless communication systems, and more particularly to conveying identification information in a preamble transmission.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In time-multiplexed communication systems, a preamble may be transmitted at the beginning of a transmission burst. The preamble may signal the beginning of a burst and may be used as a phase reference (e.g., for channel estimation) for demodulation of the transmission burst. The preamble is typically used in time-multiplexed systems where the transmission burst is not scheduled (e.g., ad-hoc systems such as Wi-Fi).

SUMMARY

A preamble may be transmitted at the beginning of a transmission burst. The preamble may carry identification information for use in identifying at least one of a transmitting apparatus or a category of data being transmitted.

In an example, a method for wireless communication is described. The method may include generating a transmission burst for transmission over a wireless medium, the transmission burst comprising a preamble and a body portion, wherein the preamble comprises identification information associated with at least one of a transmitting device or a category of data being transmitted; and transmitting the transmission burst over the wireless medium.

In an example, an apparatus for wireless communication is described. The apparatus may include a processor, and memory coupled to the processor, wherein the processor is configured to: generate a transmission burst for transmission over a wireless medium, the transmission burst comprising a preamble and a body portion, wherein the preamble comprises identification information associated with at least one of a transmitting device or a category of data being transmitted; and transmit the transmission burst over the wireless medium.

In an example, an apparatus for wireless communication is described. The apparatus may include means for generating a transmission burst for transmission over a wireless medium, the transmission burst comprising a preamble and a body portion, wherein the preamble comprises identification information associated with at least one of a transmitting device or a category of data being transmitted; and means for transmitting the transmission burst over the wireless medium.

In an example, a non-transitory computer-readable medium storing computer-executable instructions for wireless communication is described. The instructions may include instructions to generate a transmission burst for transmission over a wireless medium, the transmission burst comprising a preamble and a body portion, wherein the preamble comprises identification information associated with at least one of a transmitting device or a category of data being transmitted; and instructions to transmit the transmission burst over the wireless medium.

In some examples of the method, apparatuses, or non-transitory computer-readable medium, generating the transmission burst may include processes, features, means, or instructions for determining a preamble sequence, and scrambling the preamble sequence based at least in part on the identification information. In other examples, the preamble sequence remains unscrambled. In some examples of the method, apparatuses, or non-transitory computer-readable medium, transmitting the transmission burst may include processes, features, means, or instructions for determining a time or frequency location for the preamble based at least in part on the identification information, and transmitting the preamble at the time or frequency location. In some examples of the method, apparatuses, or non-transitory computer-readable medium, the time or frequency location comprises regularly spaced subcarriers. In some examples of the method, apparatuses, or non-transitory computer-readable medium, determining the time or frequency location may include processes, features, means, or instructions for performing a modulo operation on the identification information, determining a subcarrier index offset based at least in part on the modulo operation, and selecting one or more subcarriers for transmitting the preamble based at least in part on the subcarrier index offset.

In some examples of the method, apparatuses, or non-transitory computer-readable medium, the identification information comprises a cell identification. In some examples of the method, apparatuses, or non-transitory computer-readable medium, the identification information comprises a group identification associated with a group of cells. In some examples of the method, apparatuses, or non-transitory computer-readable medium, the identification information comprises a user equipment (UE) identification. In some examples of the method, apparatuses, or non-transitory computer-readable medium, the identification information comprises a data identification associated with a category of data carried in the body portion of the transmission burst, or a data identification associated with a category of data carried in another portion of a transmission.

In some examples of the method, apparatuses, or non-transitory computer-readable medium, transmitting the transmission burst may include processes, features, means, or instructions for transmitting over an unlicensed radio frequency spectrum band. In some examples of the method, apparatuses, or non-transitory computer-readable medium, the transmission burst comprises a time division duplex (TDD) transmission. In some examples of the method, apparatuses, or non-transitory computer-readable medium, the body portion may contain user data and/or various control information generated by physical, MAC, or upper layers of the protocol stack, such as acknowledgement (ACK) data, negative-acknowledgement (NACK) data, DL grants, UL grants, protocol headers, and the like.

In an example, a method for wireless communication is described. The method may include receiving a transmission burst, the transmission burst comprising a preamble and a body portion; and determining identification information associated with at least one of a transmitting device, a category of data in the body portion, or a category of data in another portion of a transmission based at least in part on the preamble of the transmission burst.

In an example, an apparatus for wireless communication is described. The apparatus may include a processor, and memory coupled to the processor, wherein the processor is configured to: receive a transmission burst, the transmission burst comprising a preamble and a body portion; and determine identification information associated with at least one of a transmitting device, a category of data in the body portion, or a category of data in another portion of a transmission based at least in part on the preamble of the transmission burst.

In an example, an apparatus for wireless communication is described. The apparatus may include means for receiving a transmission burst, the transmission burst comprising a preamble and a body portion; and means for determining identification information associated with at least one of a transmitting device, a category of data in the body portion, or a category of data in another portion of a transmission based at least in part on the preamble of the transmission burst.

In an example, a non-transitory computer-readable medium storing computer-executable instructions for wireless communication is described. The instructions may include instructions to receive a transmission burst, the transmission burst comprising a preamble and a body portion; and instructions to determine identification information associated with at least one of a transmitting device, a category of data in the body portion, or a category of data in another portion of a transmission based at least in part on the preamble of the transmission burst.

In some examples of the method, apparatuses, or non-transitory computer-readable medium, the identification information comprises at least one of a cell identification, a group identification associated with a group of cells, a user equipment (UE) identification, a data identification associated with a category of data carried in the body portion of the transmission burst, or a data identification associated with a category of data carried in another portion of a transmission. Some examples of the method, apparatuses, or non-transitory computer-readable medium may include processes, features, means, or instructions for determining whether the cell identification matches a serving cell identification. Some examples of the method, apparatuses, or non-transitory computer-readable medium, may include processes, features, means, or instructions for ignoring the body portion of the transmission burst based at least in part on the identification information.

Some examples of the method, apparatuses, or non-transitory computer-readable medium may include processes, features, means, or instructions for determining an interference measurement of the transmission burst based at least in part on the identification information. Some examples of the method, apparatuses, or non-transitory computer-readable medium may include processes, features, means, or instructions for transmitting the interference measurement to a serving cell associated with the serving cell identification, which may be transmitted as part of a channel quality indicator (CQI) Report. Some examples of the method, apparatuses, or non-transitory computer-readable medium may include processes, features, means, or instructions for canceling the transmission burst based at least in part on the interference measurement.

Some examples of the method, apparatuses, or non-transitory computer-readable medium may include processes, features, means, or instructions for determining a channel estimation based at least in part on the received preamble. Some examples of the method, apparatuses, or non-transitory computer-readable medium may include processes, features, means, or instructions for determining the beginning of the body portion of the transmission burst based at least in part on the received preamble. In some examples of the method, apparatuses, or non-transitory computer-readable medium, the transmission burst is received over an unlicensed radio frequency spectrum band. In some examples of the method, apparatuses, or non-transitory computer-readable medium, the transmission burst comprises a time division duplex (TDD) communication. In some examples of the method, apparatuses, or non-transitory computer-readable medium, the body portion may contain user data and/or various control information generated by physical, MAC, or upper layers of the protocol stack, such as acknowledgement (ACK) data, negative-acknowledgement (NACK) data, DL grants, UL grants, protocol headers, and the like.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described for conveying identification information in a preamble associated with a transmission burst. A transmission burst may be generated for transmission over a wireless medium. The transmission burst may include the preamble and a body portion. The preamble may include identification information associated with the transmitting device, such as a cell identifier, a UE identifier, a group identifier, a traffic category indicator, or other identification information. The body portion may contain user data and/or various control information generated by physical, MAC, and upper layers of the protocol stack, such as acknowledgement (ACK) data, negative-acknowledgement (NACK) data, DL grants, UL grants, protocol headers, and the like. The transmission burst may then be transmitted over the wireless medium.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

As used in this description and the appended claims, the term "preamble" refers to a set of one or more pre-defined sequences transmitted at the beginning of a burst.

As used in this description and the appended claims, the term "burst" refers to an uninterrupted wireless transmission over a defined set of one or more channels. A transmission burst can be uninterrupted, for instance, over a time period and/or a logical period.

Figure 1:
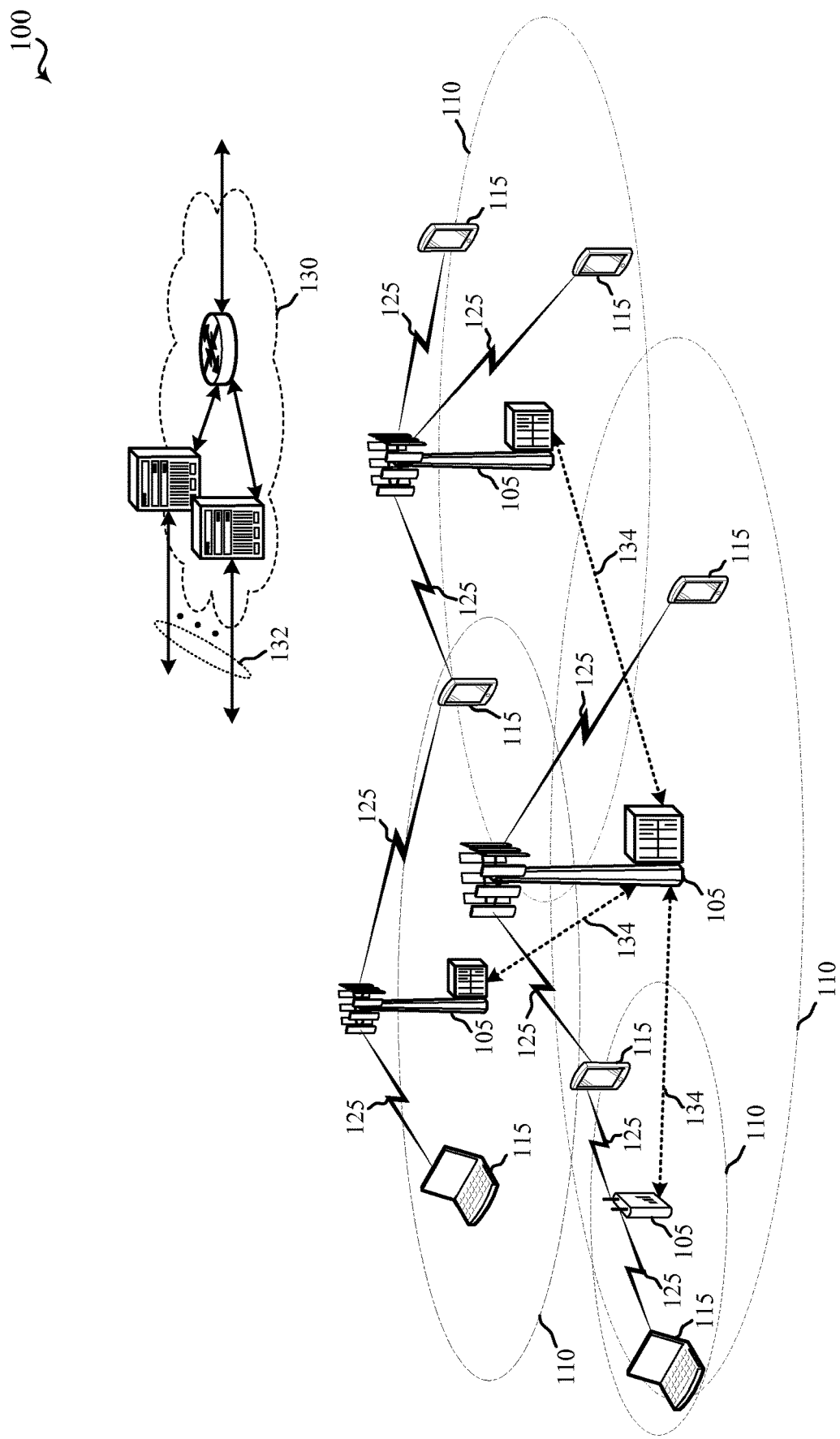
FIG. 1 shows a block diagram of a wireless communication system, in accordance with various aspects of the present disclosure.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an evolved or enhanced NodeB (eNB), a Home NodeB, a Home eNB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 may be dispersed throughout the wireless communication system 100, and each UE 115 may be stationary or mobile. A UE 115 may include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may be called forward link transmissions, while the uplink transmissions may be called reverse link transmissions. In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some embodiments of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternately support operation over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). Upon winning a contention for access to the unlicensed radio frequency spectrum band, a transmitting apparatus (e.g., a base station 105 or UE 115) may transmit a preamble over the unlicensed radio frequency spectrum band. The preamble may signal to a receiving apparatus that the unlicensed radio frequency spectrum band has been successfully accessed and that a transmission burst is beginning. The receiving apparatus may use the preamble for channel estimation of the unlicensed radio frequency spectrum band.

Additionally or alternately, the transmitting apparatus may transmit a preamble over the licensed radio frequency spectrum band to signal that a transmission burst is beginning. The receiving apparatus may use the preamble for channel estimation of the licensed radio frequency spectrum band.

Additionally or alternatively, the preamble may carry identification information associated with at least one of the transmitting device or a category of data being transmitted, such as a category of data in the transmission burst or a category of data in another portion of a transmission, over either the licensed or unlicensed radio frequency spectrum band. The identification information may include, for example, a cell identification, a group identification associated with a group of cells, a UE identification, a group identification associated with a group of UEs, or an identification of the category of data being transmitted in the transmission burst. The receiving apparatus may utilize the cell identification (or identification of a group of cells) to determine whether the transmission burst is being transmitted by a cell, or group of cells, serving the receiving apparatus. The receiving apparatus may utilize the UE identification (or identification of a group of UEs) to determine whether the transmission burst is being transmitted by a UE, or group of UEs, served by the receiving apparatus. The receiving apparatus may utilize the identification of the category of data to determine whether the transmission burst is carrying useful data.

Figure 2:
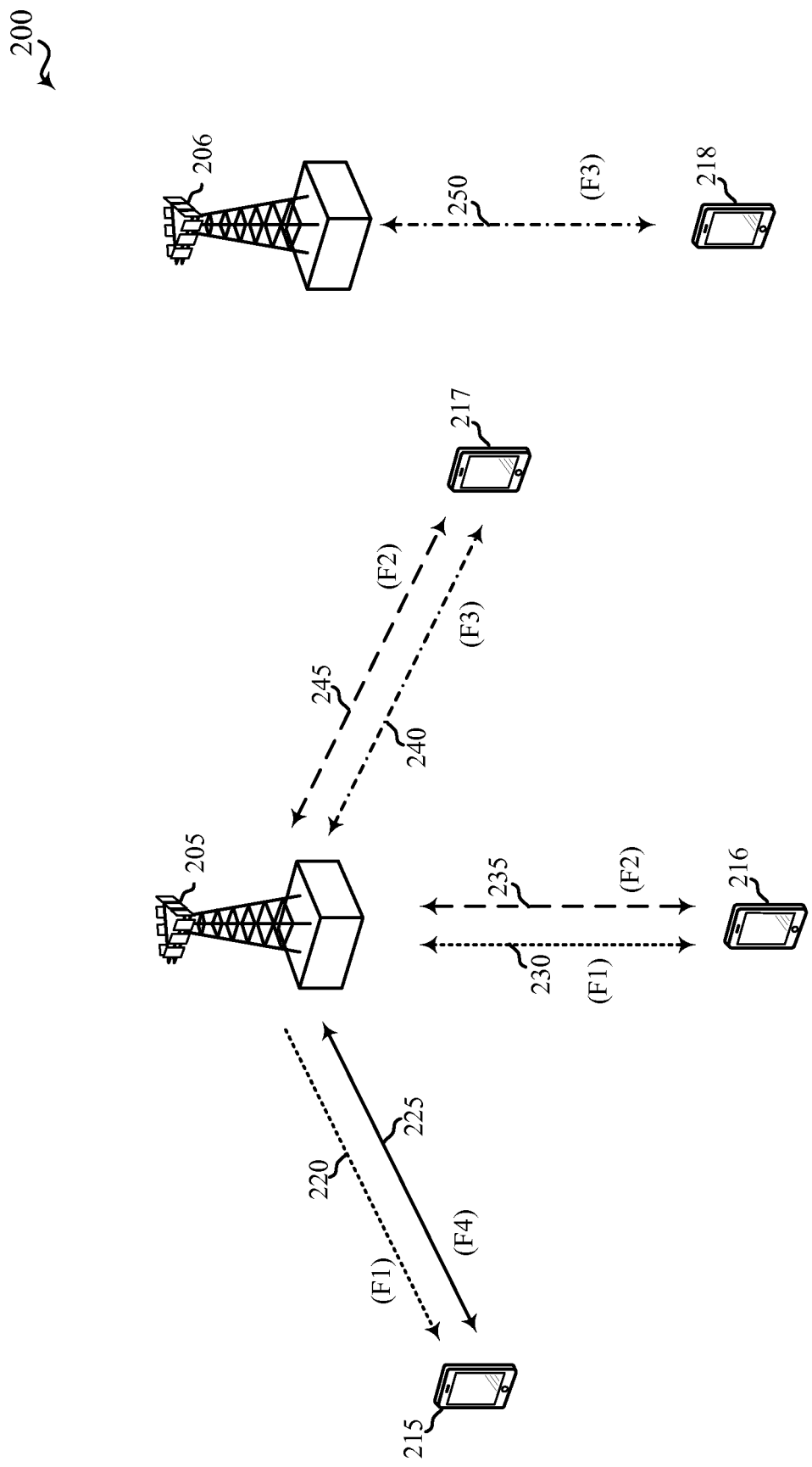
FIG. 2 shows a wireless communication system in which LTE/LTE-A may be deployed under different scenarios using an unlicensed radio frequency spectrum band, in accordance with various aspects of the present disclosure.

FIG. 2 shows a wireless communication system 200 in which LTE/LTE-A may be deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 206 may be examples of aspects of one or more of the base stations 105 described with reference to FIG. 1, while a first UE 215, a second UE 216, a third UE 217, and a fourth UE 218 may be examples of aspects of one or more of the UEs 115 described with reference to FIG. 1.

In some examples of a supplemental downlink mode in the wireless communication system 200, the first base station 205 may transmit a communication to the first UE 215 using a downlink channel 220. The downlink channel 220 may be associated with a frequency F1 in an unlicensed radio frequency spectrum band. The first base station 205 may transmit the communication to the first UE 215 using a first bidirectional link 225 and may receive a communication from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic or signaling congestion.

In some examples of a carrier aggregation mode in the wireless communication system 200, the first base station 205 may transmit a communication to the second UE 216 using a second bidirectional link 230 and may receive a communication from the second UE 216 using the second bidirectional link 230. The second bidirectional link 230 may be associated with the frequency F1 in the unlicensed radio frequency spectrum band. Additionally or alternatively, the first base station 205 may transmit a communication to the second UE 216 using a third bidirectional link 235 and may receive a communication from the second UE 216 using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In some examples of a carrier aggregation mode in the wireless communication system 200, the first base station 205 may transmit a communication to the third UE 217 using a fourth bidirectional link 240 and may a communication from the third UE 217 using the fourth bidirectional link 240. The fourth bidirectional link 240 may be associated with a frequency F3 in the unlicensed radio frequency spectrum band. Additionally or alternatively, the first base station 205 may transmit a communication to the third UE 217 using a fifth bidirectional link 245 and may receive a communication from the third UE 217 using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

In some examples of a standalone mode in the wireless communication system 200, the second base station 206 may transmit a communication to the fourth UE 218 using a bidirectional link 250 and may receive a communication from the fourth UE 218 using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a boot-strapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In some examples of a carrier aggregation mode, data and control may be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

The data communications may be in the form of a transmission burst. The transmission burst may include a preamble and a body portion. The preamble may signal to a receiving apparatus that the unlicensed radio frequency spectrum band has been successfully accessed, if the communication is over an unlicensed radio frequency spectrum band. Additionally or alternatively, the preamble may signal to a receiving apparatus that a transmission burst is beginning. The receiving apparatus may use the preamble for channel estimation of the licensed or unlicensed radio frequency spectrum band.

Additionally or alternatively, the preamble may carry identification information associated with at least one of a transmitting apparatus or a category of data being transmitted, such as a category of data in the transmission burst or a category of data in another portion of a transmission, over either the licensed or unlicensed radio frequency spectrum band. The identification information may include, for example, a cell identification, a group identification associated with a group of cells, a UE identification, or an identification of the category of data being transmitted in the transmission burst. The receiving apparatus may utilize the cell identification (or identification of a group of cells) to determine whether the transmission burst is being transmitted by a cell, or group of cells, serving the receiving apparatus. The receiving apparatus may utilize the UE identification to determine whether the transmission burst is being transmitted by a UE associated with the transmitting apparatus. The receiving apparatus may utilize the identification of the category of data to determine whether the transmission burst is carrying useful data.

In some examples, a transmitting apparatus such as one of the base stations 105, 205, or 206 described with reference to FIG. 1 or 2, or one of the UEs 115, 215, 216, 217, or 218 described with reference to FIG. 1 or 2, may use a gating interval to gain access to a channel of an unlicensed radio frequency spectrum band (e.g., to a physical channel of the unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as a listen before talk (LBT) protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of an unlicensed radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the unlicensed radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
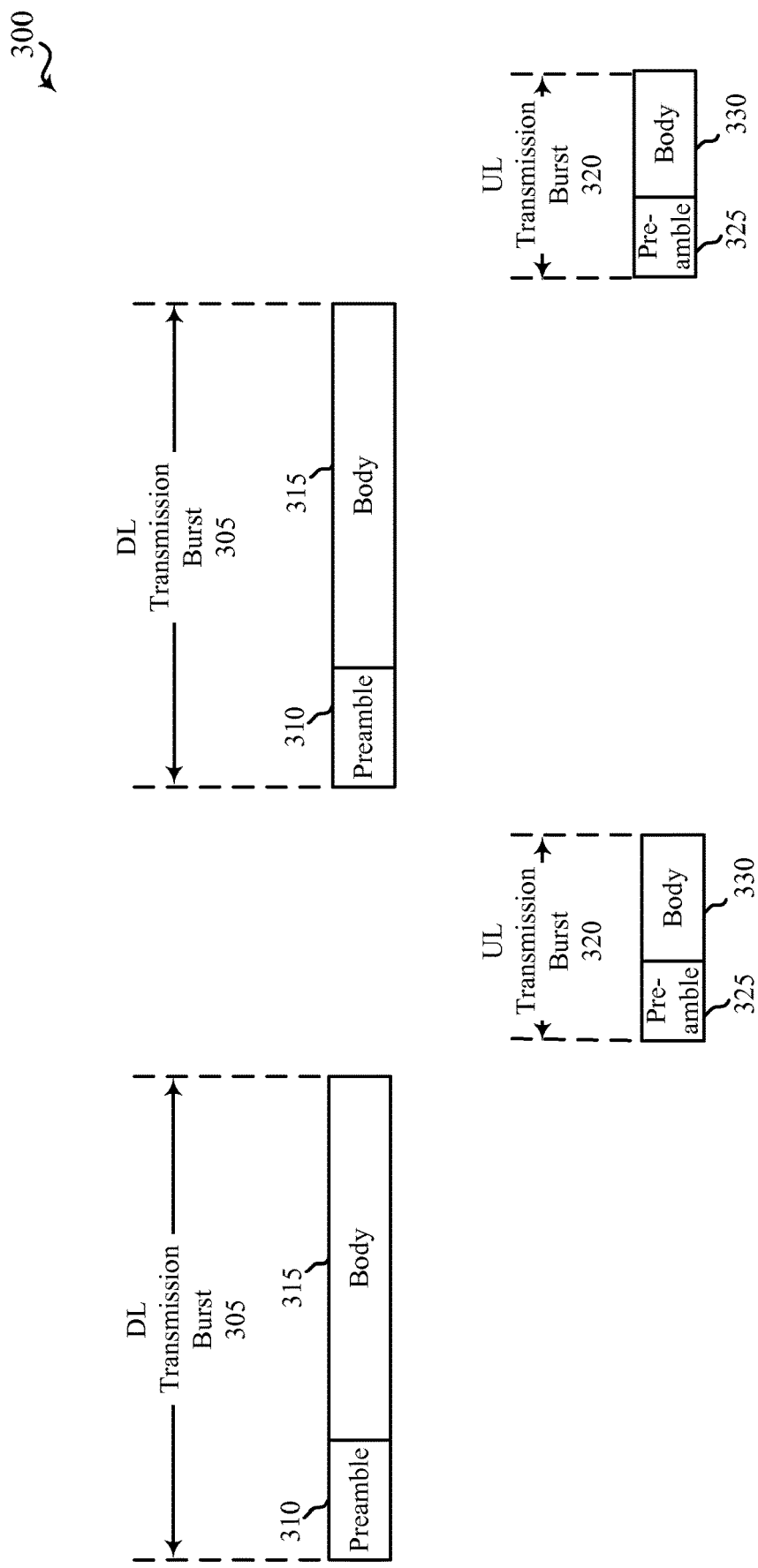
FIG. 3 shows an example of a wireless communication, in accordance with various aspects of the present disclosure.

FIG. 3 shows an example 300 of a wireless communication, in accordance with various aspects of the present disclosure. The communication includes at least one downlink (DL) transmission burst 305 and at least one uplink (UL) transmission burst 320. In some examples, the DL transmission burst 305 may include a preamble 310 and a body portion 315. In some examples, the UL transmission burst 320 may include a preamble 325 and a body portion 330. In some examples, the UL transmission burst may be a scheduled communication, and may only include a body portion 330. The DL transmission burst 305 may be transmitted by a transmitting apparatus, such as a base station 105, 205, or 206 as described in reference to FIGS. 1 and 2. The DL transmission burst 305 may be received by a receiving apparatus, such as a UE 115, 215, 216, 217, or 218 as described in reference to FIGS. 1 and 2. The UL transmission burst 320 may be transmitted by a transmitting apparatus, such as a UE 115, 215, 216, 217, or 218 as described in reference to FIGS. 1 and 2. The UL transmission burst 320 may be received by a receiving apparatus, such as a base station 105, 205, or 206 as described in reference to FIGS. 1 and 2.

For DL transmission bursts 305, the transmitting apparatus may transmit the preamble 310 at the beginning of each DL transmission burst 305. The preamble 310 may carry identification information associated with at least one of the transmitting apparatus or a category of data being transmitted, such as a category data in the body portion 315. The identification information may include, for example, a cell identification, a group identification associated with a group of cells, or an identification of the category of data being transmitted in the DL transmission burst 305.

The preamble 310 may be utilized by the receiving apparatus to perform channel estimation at the beginning of the DL transmission burst 305. Channel estimation may be helpful after a long period of inactivity of the transmitting apparatus or after a discontinuous receive (DRX) interval of the receiving apparatus. The preamble 310 may signal the start of the DL transmission burst 305. If the DL transmission burst 305 is transmitted over an unlicensed radio frequency spectrum, then the preamble 310 may, for example, signal successful access to the unlicensed radio frequency spectrum.

When the identification information carried by the preamble 310 includes a cell identification, or a group identification associated with a group of cells, the identification information may enable the receiving apparatus (e.g., UE) to differentiate the DL transmission burst 305 from a particular transmitting apparatus (e.g., a cell serving the UE, or a group of cells associated with the UE) from DL transmission bursts from another transmitting apparatus (e.g., a neighboring cell, or cells belonging to different networks). In this way, the receiving apparatus (e.g., UE) may look for a preamble 310 only from a particular known transmitting apparatus (e.g., the cell serving the UE, or group of cells associated with the UE). If the preamble carries identification information (e.g., cell identification) that does not match the known transmitting apparatus, then the body portion of the DL transmission burst may be ignored by the receiving apparatus (e.g., UE). In this way, the receiving apparatus (e.g., UE) may measure interference, as preambles from other transmitting apparatus may be perceived as interference.

The receiving apparatus may use the preamble from an interfering transmitting apparatus for estimating the channel from the interfering transmitting apparatus. The channel estimate of the interfering transmitting apparatus may be used by the receiving apparatus for improving demodulation or decoding. For example, the channel estimate of the interfering transmitting apparatus may be used to improve interference estimation. In another example, the channel estimate of the interfering transmitting apparatus may be used for demodulating, decoding, and canceling data transmissions from the interfering transmitting apparatus. In yet another example, the channel estimate of the interfering transmitting apparatus may be used for enhancing the demodulation and decoding of a data transmission from the known transmitting apparatus.

When the identification information carried by the preamble 310 includes an identification of the category of data being transmitted in the DL transmission burst 305, the identification information may enable the receiving apparatus (e.g. UE) to differentiate the category of data in the body portion 315. For example, the identification information may convey that the body portion 315 includes unicast traffic. Alternatively or in addition, the identification information may convey that the body portion 315 includes broadcast or multicast traffic. Alternatively or in addition, the identification information may convey that the body portion 315 includes control data, such as acknowledgement/negative-acknowledgement (ACK/NACK) data.

The identification information may enable the receiving apparatus (e.g. UE) to differentiate an interested service from uninterested services. For example, the identification information may convey that the body portion 315 may include control data, such as acknowledgement/negative-acknowledgement (ACK/NACK) data. The ACK/NACK may be an interested service to a UE that had previously sent an uplink traffic and is expecting an ACK/NACK. However, the ACK/NACK may be an uninterested service to all the other UEs and therefore may be ignored by them.

For UL transmission bursts 320, the transmitting apparatus (e.g., UE) may transmit the preamble 325 at the beginning of each UL transmission burst 320. The preamble 325 may carry identification information associated with at least one of the transmitting apparatus or a category of data being transmitted, such as a category of data in the body portion 330. The identification information may include, for example, a UE identification or an identification of the category of data being transmitted in the UL transmission burst 320.

When the identification information carried by the preamble 325 includes a UE identification, the identification information may enable the receiving apparatus (e.g., serving cell) to differentiate the UL transmission burst 320 from a particular transmitting apparatus (e.g., UE being served by the cell) from UL transmission bursts from another transmitting apparatus (e.g., UEs belonging to different networks). In this way, the receiving apparatus (e.g., serving cell) may look for a preamble 325 only from a particular known transmitting apparatus (e.g., the UE being served by the cell). If the preamble carries identification information (e.g., UE identification) that does not match the known transmitting apparatus, then the UL transmission burst may be ignored by the receiving apparatus (e.g., serving cell). In this way, the receiving apparatus (e.g., serving cell) may measure interference, as preambles from other transmitting apparatus may be perceived as interference.

In scheduling based systems such as LTE/LTE-A, the UL transmissions are typically scheduled by the serving eNB. In such a scenario, the eNB expects control/data transmission from the scheduled UE at a particular time and frequency resource. In this case, the identification information may enable the receiving eNB to differentiate the UL transmission burst from the scheduled UE from UL transmission bursts from another UE. In this way, the serving eNB may look for a preamble only from the scheduled UE. If the preamble carries identification information that does not match the schedule UE, then the UL transmission burst may be ignored by the serving eNB. In this way, the receiving apparatus (e.g., serving eNB) may measure interference, as preambles from other transmitting apparatus may be perceived as interference.

In scheduling based systems such as LTE/LTE-A, the eNB may still allow non-scheduled UL transmissions. For example, the serving eNB may allow contention-based UL transmissions of control information and/or user data under certain conditions. In this case, the identification information carried by the preamble may convey that the transmission is non-scheduled. This allows the receiving eNB to differentiate scheduled vs. non-scheduled UL transmissions. The identification information may further convey the UE identification, or instead, the UE identification may be conveyed in the body portion of the UL transmission burst.

The receiving apparatus may use the preamble from an interfering transmitting apparatus for estimating the channel from the interfering transmitting apparatus. The channel estimate of the interfering transmitting apparatus may be used by the receiving apparatus for improving demodulation or decoding. For example, the channel estimate of the interfering transmitting apparatus may be used to improve interference estimation. In another example, the channel estimate of the interfering transmitting apparatus may be used for demodulating, decoding, and canceling data transmissions from the interfering transmitting apparatus. In yet another example, the channel estimate of the interfering transmitting apparatus may be used for enhancing the demodulation and decoding of a data transmission from the known transmitting apparatus.

In a TDD cellular system, the preamble 310 may be transmitted by an eNB in a DL transmission burst 305. The UL transmission burst 320 may be scheduled by the eNB, allowing the eNB to already know the start timing and identities of UEs that will transmit on UL. Therefore, the preamble 325 for the UL transmission burst 320 may not be utilized. The identification information carried by the preamble 310 of the DL transmission burst 305 may convey the cell identification of the eNB to the UE. The cell identification may be conveyed by a common reference signal (CRS). The CRS may be used by a UE to sync to the start of DL transmission burst 305. Additionally or alternately, the preamble 310 may be used by a UE to obtain channel estimates for channel demodulation of the DL transmission burst 305.

Figure 4:
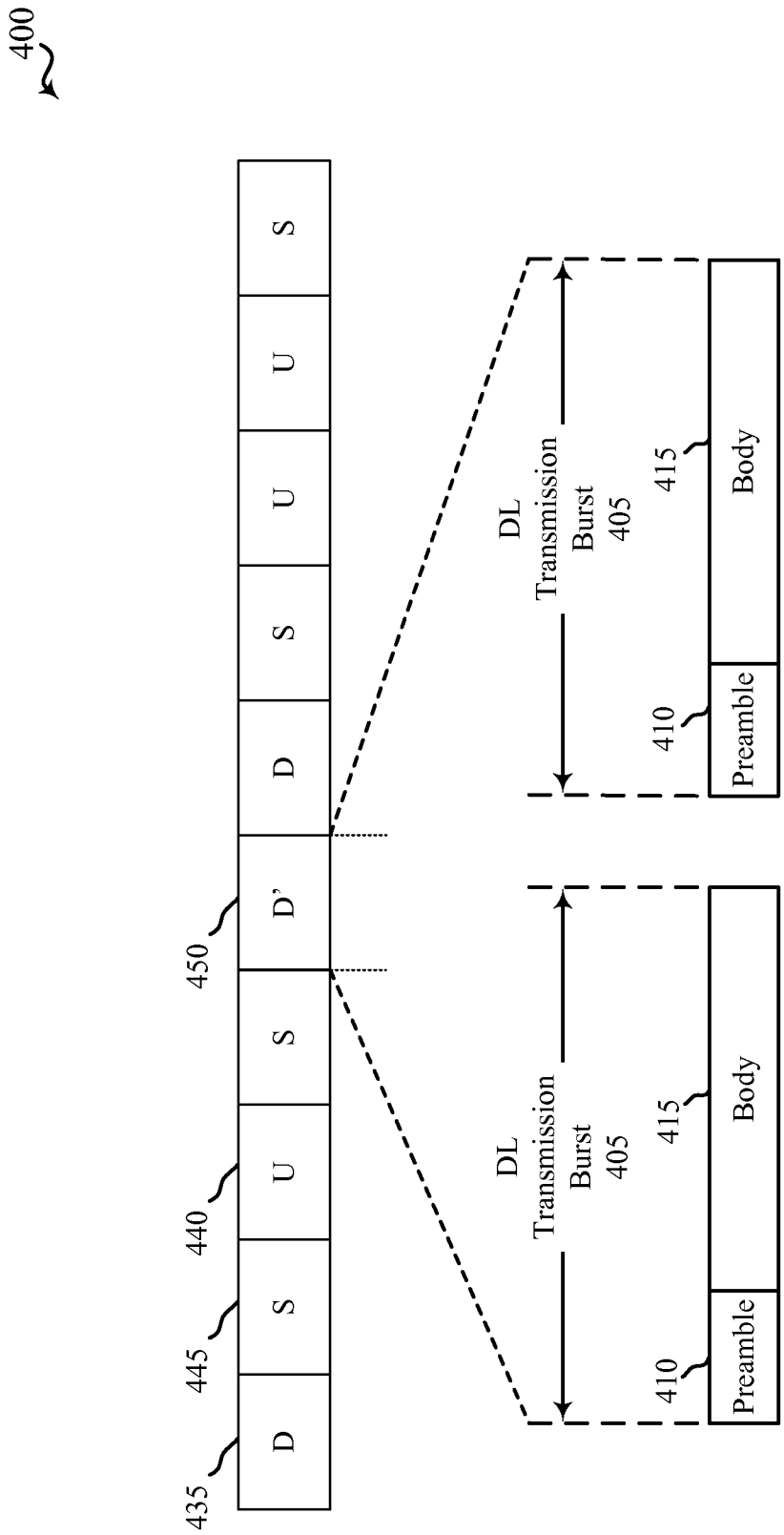
FIG. 4 is a block diagram conceptually illustrating an example of TDD subframes that may be transmitted in a wireless communication system, in accordance with various aspects of the present disclosure.

FIG. 4 is a block diagram 400 conceptually illustrating an example of a TDD frame structure that may be transmitted in a wireless communication system, in accordance with various aspects of the present disclosure. The frame structure of FIG. 4 may be communicated using portions of the wireless communication system 100 described with reference to FIG. 1 between one or more base stations 105 and one or more UEs 115, for example. In this example, a communication may include one or more downlink (D) subframes 435, one or more special (S) subframes 445, and one or more uplink (U) subframes 440. Enhanced downlink (D') subframes 450 may replace a number of the downlink subframes 435. Enhanced downlink subframes 450, according to some examples, may be transmitted in a different hierarchical layer than downlink subframes 435, special subframes 445, and uplink subframes 440. In the example of FIG. 4, an enhanced downlink subframe 450 may include a one or more DL transmission bursts 405. Each DL transmission burst 405 may include a preamble 410 and a body portion 415. The preamble 410 may carry identification information associated with at least one of the base station or a category of data being transmitted, such as a category of data in the body portion 415. The identification information may include, for example, a cell identification, a group identification associated with a group of cells, or an identification of the category of data being transmitted in the body portion 415 or in other downlink subframes 435.

The number of enhanced downlink subframes 450 included in the TDD frame structure may increase or decrease based at least in part on system requirements, demands of the system at a particular time, or one or more other factors. In some cases, enhanced downlink subframes 450 may be used exclusively, in place of downlink subframes 435. Such configurations may be set by a carrier, may be semi-static, or may be dynamically changed based at least in part on conditions of the wireless communications system at a particular time.

Figure 5:
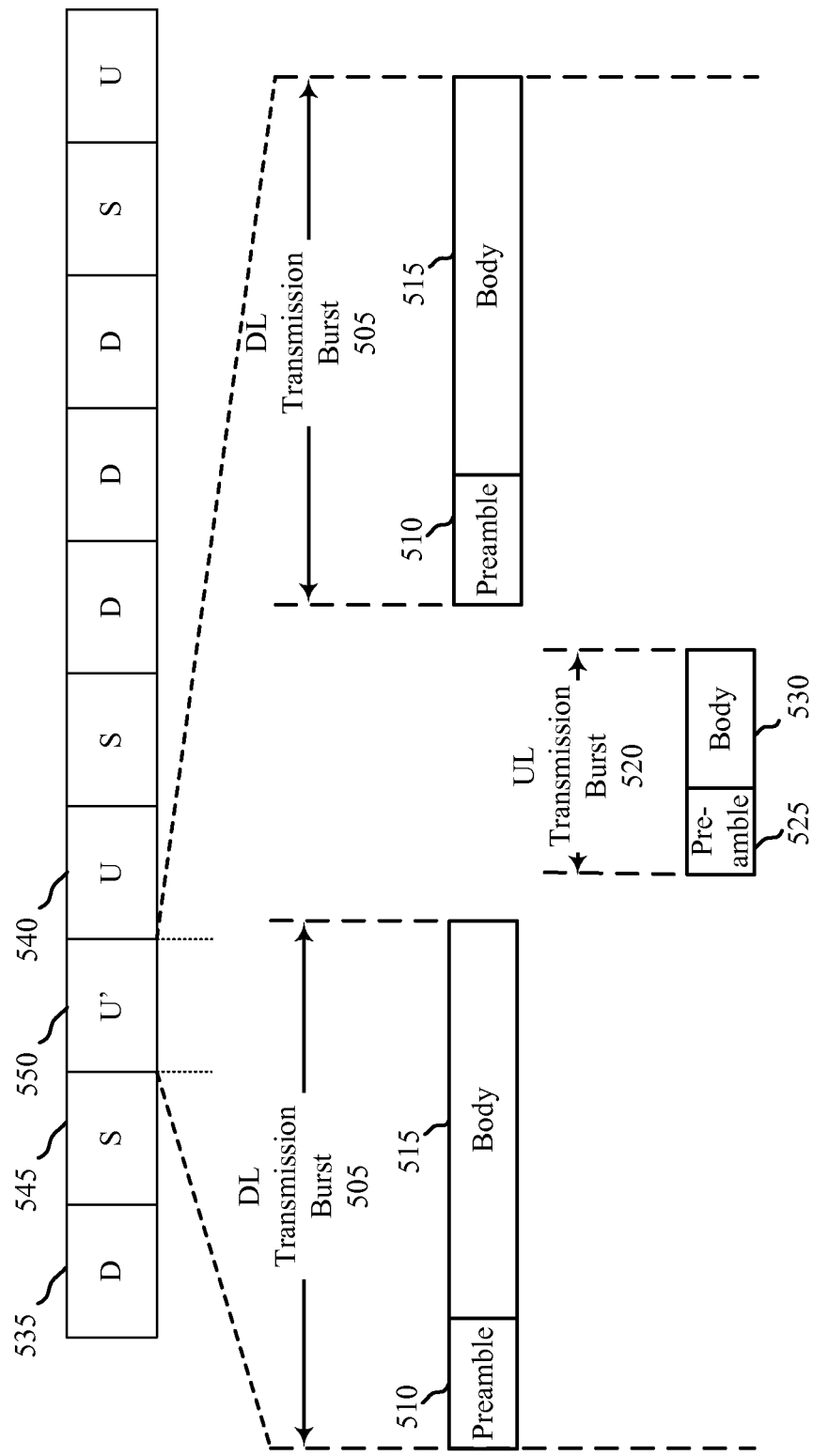
FIG. 5 is a block diagram conceptually illustrating another example of TDD subframes that may be transmitted in a wireless communication system, in accordance with various aspects of the present disclosure.

FIG. 5 is a block diagram 500 conceptually illustrating an example of a TDD frame structure that may be transmitted in a wireless communication system, in accordance with various aspects of the present disclosure. The frame structure of FIG. 5 may be communicated using portions of the wireless communication system 100 described with reference to FIG. 1 between one or more base stations 105 and one or more UEs 115, for example. In this example, a communication may include one or more downlink (D) subframes 535, one or more special (S) subframes 545, and one or more uplink (U) subframes 540. Enhanced uplink (U') subframes 550 may replace a number of the uplink subframes 540. Enhanced uplink subframes 550, according to some examples, may be transmitted in a different hierarchical layer than downlink subframes 535, special subframes 545, and uplink subframes 540. In the example of FIG. 5, an enhanced uplink subframe 550 may include one or more DL transmission bursts 505 and one or more UL transmission bursts 520.

Each DL transmission burst 505 may include a preamble 510 and a body portion 515. The preamble 510 may carry identification information associated with the base station. The identification information may include, for example, a cell identification, a group identification associated with a group of cells, or an identification of the category of data being transmitted, such as a category of data in the body portion 515 or in other downlink sub frames 535.

Each UL transmission burst 520 may include a preamble 525 and a body portion 530. The preamble 525 may carry identification information associated with the transmitting apparatus (e.g., UE). The identification information may include, for example, a UE identification or an identification of the category of data being transmitted, such as a category of data in the body portion 530 or in other uplink subframes 540.

The number of enhanced uplink subframes 550 included in the TDD frame structure may increase or decrease based at least in part on system requirements, demands of the system at a particular time, or one or more other factors. In some cases, enhanced uplink subframes 550 may be used exclusively, in place of uplink subframes 535. Such configurations may be set by a carrier, may be semi-static, or may be dynamically changed based at least in part on conditions of the wireless communications system at a given time. In some examples, a TDD frame structure may include both enhanced downlink subframes 450 as shown in FIG. 4, and enhanced uplink subframes 550, as shown in FIG. 5.

Figure 6:
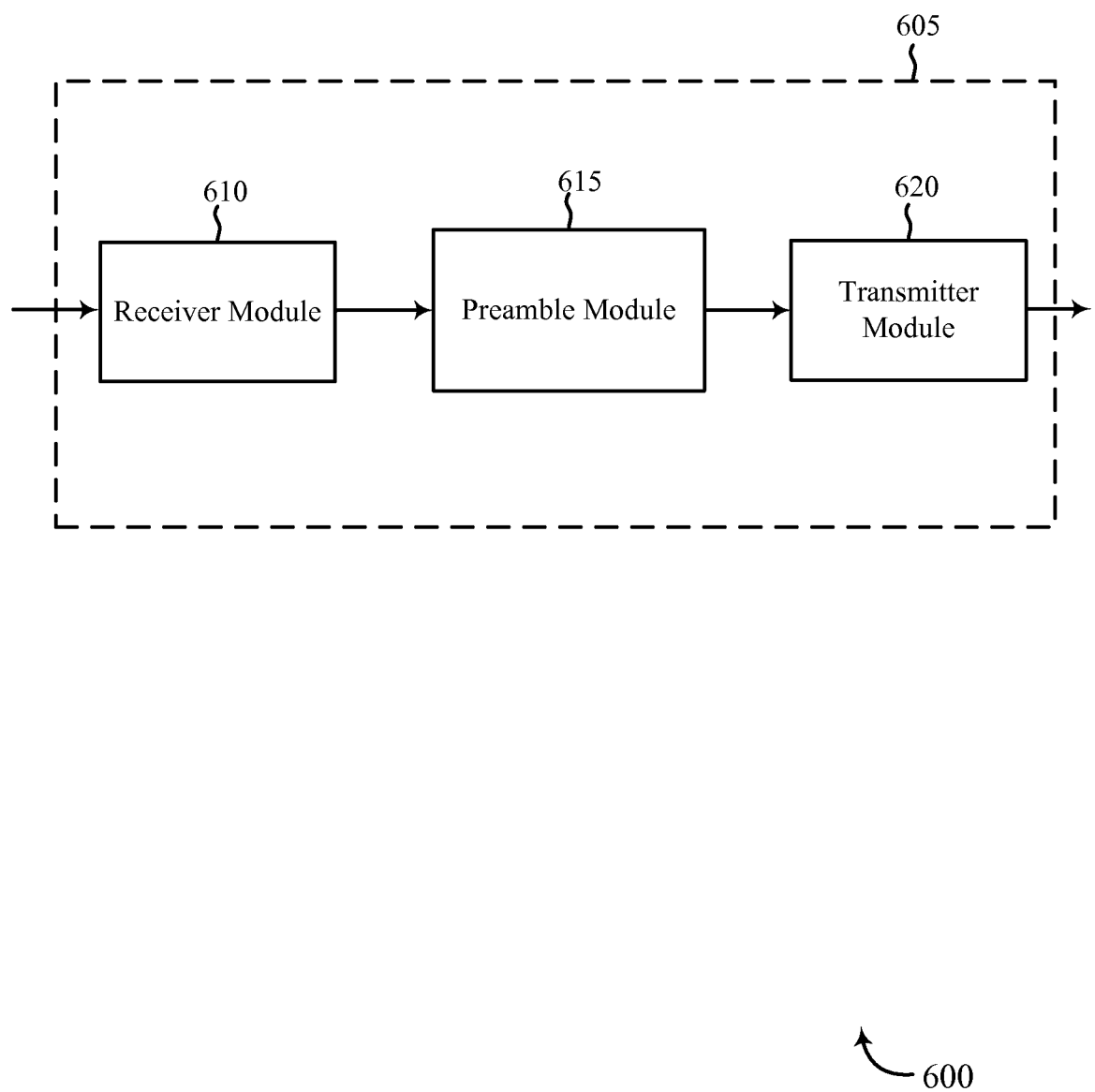
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the UEs 115, 215, 216, 217, or 218 described with reference to FIGS. 1 and 2, or an example of aspects of one or more of the base stations 105, 205, or 206 described with reference to FIGS. 1 and 2. Additionally or alternatively, the apparatus 605 may be or include a processor. The apparatus 605 may include a receiver module 610, a preamble module 615, and a transmitter module 620. Each of these modules may be in communication with each other.

The modules of the apparatus 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. Additionally or alternatively, the functions of each module may be implemented, in whole or in part, with instructions embodied in a memory, formatted to be executed by one or more general or application-specific processors.

In some examples, the receiver module 610 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1 or 2. The receiver module 610 may be used to receive various categories of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 620 may include at least one RF transmitter, such as at least one RF transmitter operable to transmit over the licensed radio frequency spectrum band or the unlicensed radio frequency spectrum band. The transmitter module 620 may be used to transmit various categories of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the preamble module 615 may be used to generate a preamble to be transmitted by the transmitter module 620. In other examples, the preamble module 615 may utilize a preamble received from the receiver module 610.

For a preamble transmitted by the transmitter module 620, the preamble may carry identification information associated with the apparatus 605. The identification information may include, for example, a cell identification, a group identification associated with a group of cells, a UE identification, or an identification of the category of data being transmitted following the preamble. In some examples, the preamble module 615 may include the identification information in the preamble by scrambling a preamble sequence based at least in part on the identification information. The preamble may be transmitted by the transmitter module 620 at the beginning of a transmission burst.

In some examples, a time or frequency location for transmitting the preamble may be determined based at least in part on the identification information. The time or frequency location may include regularly spaced subcarriers. The time or frequency location may be determined by performing a modulo operation on the identification information and determining a subcarrier index offset based at least in part on the modulo operation. For example, the subcarrier index offset may be determined by a cell ID modulo 3. The subcarriers for transmitting the preamble may then be determined based at least in part on the subcarrier index offset.

For a preamble received by the receiver module 610, the preamble module 615 may utilize the preamble to perform channel estimation at the beginning of the received transmission burst. Additionally or alternatively, the received preamble may signal the start of a transmission burst. If the transmission burst is transmitted over an unlicensed radio frequency spectrum, then the preamble may signal successful access to the unlicensed radio frequency spectrum.

The received preamble may include a cell identification, a group identification associated with a group of cells, or UE identification. The preamble module 615 may differentiate the received preamble from a particular transmitting apparatus from a preamble from another transmitting apparatus. If the preamble carries identification information (e.g., cell identification or UE identification) that does not match the known transmitting apparatus, then the preamble module 615 may ignore the body portion of the transmission burst containing the unknown preamble.

When the identification information carried by the preamble includes an identification of the category of data being received, the preamble module 615 may differentiate an interested service from uninterested services based at least in part on the identification of the category. For example, an interested service may include data requested by the apparatus 605. An uninterested service may include control data, such as acknowledgement/negative-acknowledgement (ACK/NACK) data.

Figure 7:
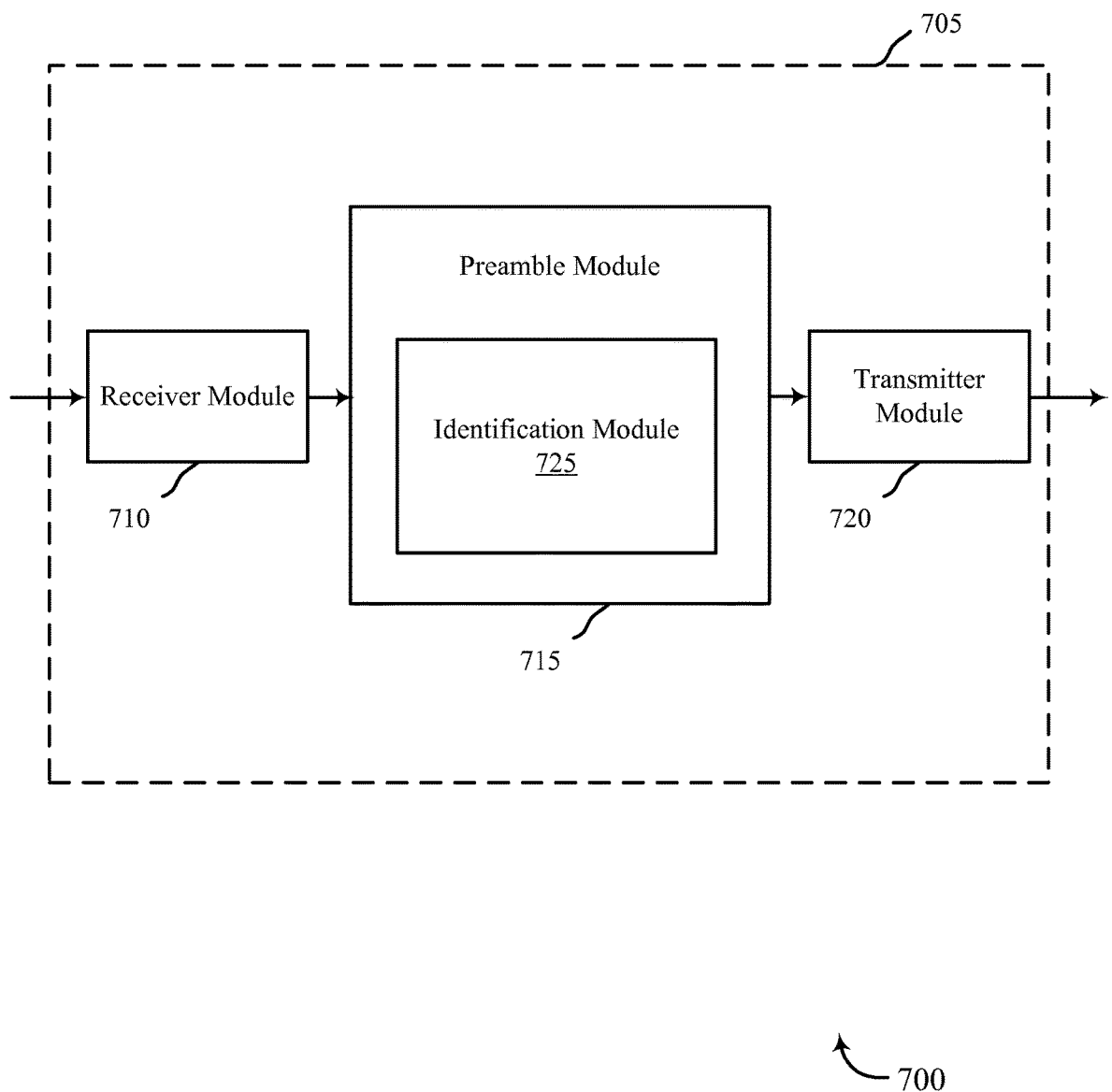
FIG. 7 shows a block diagram of another apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the UEs 115 or 215 described with reference to FIGS. 1 and 2, or an example of aspects of one or more of the base stations 105 or 205 described with reference to FIGS. 1 and 2, or aspects of the apparatus 605 described with reference to FIG. 6. Additionally or alternately, the apparatus 705 may be or include a processor. The apparatus 705 may include a receiver module 710, a preamble module 715, and a transmitter module 720. Each of these modules may be in communication with each other.

The modules of the apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. Additionally or alternately, the functions of each module may be implemented, in whole or in part, with instructions embodied in a memory, formatted to be executed by one or more general or application-specific processors.

In some examples, the receiver module 710 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1 or 2. The receiver module 710 may be used to receive various categories of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 720 may include at least one RF transmitter, such as at least one RF transmitter operable to transmit over the licensed radio frequency spectrum band or the unlicensed radio frequency spectrum band. The transmitter module 620 may be used to transmit various categories of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

The preamble module 715 may be an example of aspects of the preamble module 615 described with reference to FIG. 6. The preamble module 715 may include an identification module 725.

For a preamble transmitted by the transmitter module 720, the preamble may carry identification information associated with the apparatus 705. The identification module 725 may determine the identification information to convey in the preamble. The identification information may include, for example, a cell identification, a group identification associated with a group of cells, a UE identification, or an identification of the category of data being transmitted following the preamble. In some examples, the preamble module 715 may include the identification information in the preamble by scrambling a preamble sequence based at least in part on the identification information determined by the identification module 725. The preamble may be transmitted by the transmitter module 720 at the beginning of a transmission burst.

In some examples, a time or frequency location for transmitting the preamble may be determined based at least in part on the identification information. The time or frequency location may include regularly spaced subcarriers. The time or frequency location may be determined by performing a modulo operation on the identification information and determining a subcarrier index offset based at least in part on the modulo operation. For example, the subcarrier index offset may be determined by a cell ID modulo 3. The subcarriers for transmitting the preamble may then be determined based at least in part on the subcarrier index offset.

For a preamble received by the receiver module 710, the identification module 725 may determine a cell identification, a group identification associated with a group of cells, or UE identification carried in the received preamble. The preamble module 715 may differentiate the received preamble from a particular transmitting apparatus from a preamble from another transmitting apparatus. If the identification module 725 determines that the preamble carries identification information (e.g., cell identification or UE identification) that does not match the known transmitting apparatus, then the preamble module 715 may ignore the body portion of transmission burst containing the unknown preamble.

When the identification information carried by the preamble includes an identification of the category of data being received, the identification module 725 may determine the category of data. Based at least in part on the category of data, the preamble module 715 may differentiate an interested service from uninterested services.

Figure 8:
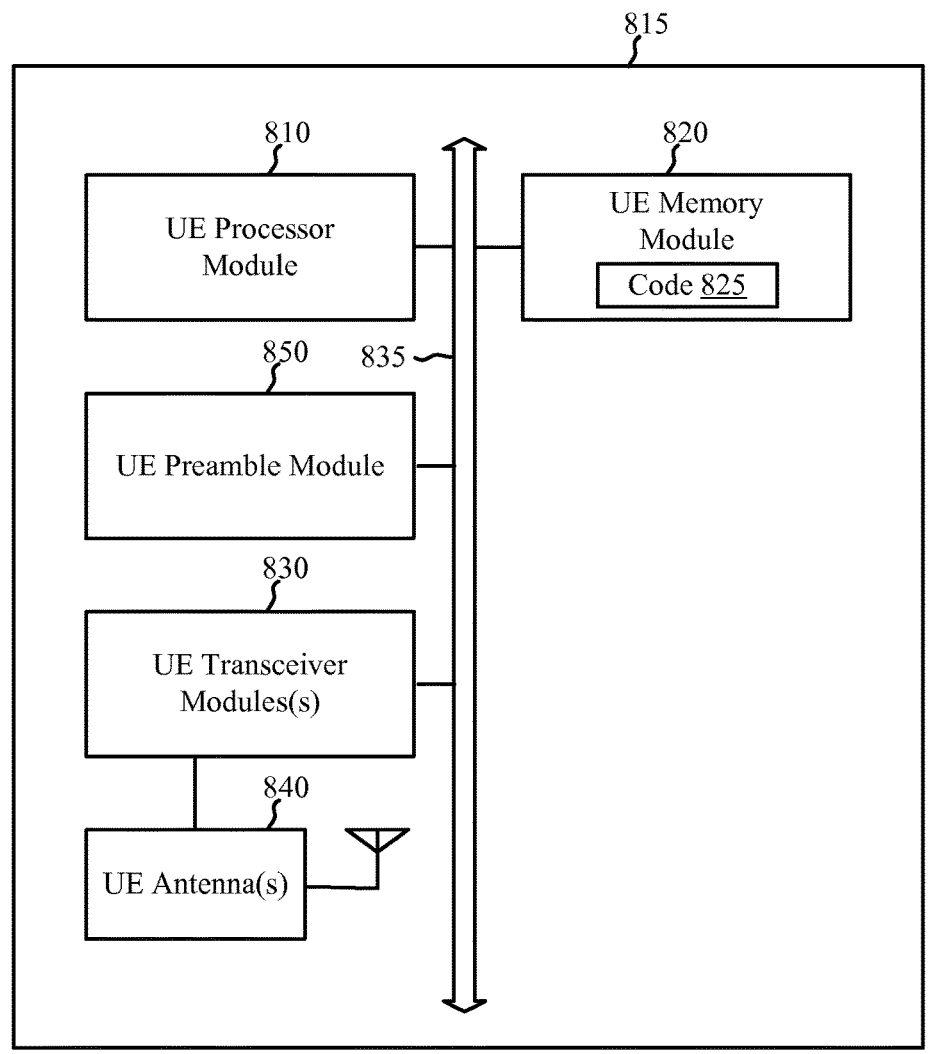
FIG. 8 shows a block diagram of a UE for use in wireless communication, in accordance with various aspects of the present disclosure.

FIG. 8 shows a block diagram 800 of a UE 815 for use in wireless communication, in accordance with various aspects of the present disclosure. The UE 815 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 815 may, in some examples, have an internal power supply (not shown), such as a small battery, to facilitate mobile operation. In some examples, the UE 815 may be an example of aspects of one or more of the UE 115 or 215 described with reference to FIGS. 1 and 2, or aspects of one or more of the apparatuses 605 or 705 described with reference to FIGS. 6 and 7. The UE 815 may be configured to implement at least some of the UE or apparatus features and functions described with reference to FIG. 1, 2, 3, 4, 5, 6, or 7.

The UE 815 may include a UE processor module 810, a UE memory module 820, at least one UE transceiver module (represented by UE transceiver module(s) 830), at least one UE antenna (represented by UE antenna(s) 840), or a UE preamble module 850. Each of these components may be in communication with each other, directly or indirectly, over one or more buses 835.

The UE memory module 820 may include random access memory (RAM) or read-only memory (ROM). The UE memory module 820 may store computer-readable, computer-executable code 825 containing instructions that are configured to, when executed, cause the UE processor module 810 to perform various functions described herein related to wireless communication, including the transmission and reception of a preamble. Alternatively, the code 825 may not be directly executable by the UE processor module 810 but be configured to cause the UE 815 (e.g., when compiled and executed) to perform various of the functions described herein.

The UE processor module 810 may include an intelligent hardware device, e.g., a central processing unit (CPU), a microcontroller, an ASIC, etc. The UE processor module 810 may process information received through the UE transceiver module(s) 830 or information to be sent to the UE transceiver module(s) 830 for transmission through the UE antenna(s) 840. The UE processor module 810 may handle, alone or in connection with the UE transceiver module(s) 830, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use). The UE processor module 810 may handle, alone or in connection with the UE transceiver module(s) 830, various aspects of communicating using ultra low latency subframes.

The UE transceiver module(s) 830 may include a modem configured to modulate packets and provide the modulated packets to the UE antenna(s) 840 for transmission, and to demodulate packets received from the UE antenna(s) 840. The UE transceiver module(s) 830 may, in some examples, be implemented as one or more UE transmitter modules and one or more separate UE receiver modules. The UE transceiver module(s) 830 may support communications in the licensed radio frequency spectrum band or the unlicensed radio frequency spectrum band. The UE transceiver module(s) 830 may be configured to communicate bi-directionally, via the UE antenna(s) 840, with one or more of the base stations 105 or 205 described with reference to FIGS. 1 and 2, or the apparatus 605 or 705 described with reference to FIGS. 6 and 7. While the UE 815 may include a single UE antenna, there may be examples in which the UE 815 may include multiple UE antennas 840.

The UE preamble module 850 may be configured to perform or control some or all of the features or functions described with reference to FIG. 1, 2, 3, 4, 5, 6, or 7, related to transmission or reception of a preamble. The UE preamble module 850 may be used, for example, to generate a preamble for a transmission burst. The preamble may include identification information associated with the UE 815. In some examples, the UE preamble module 850 may generate the preamble by scrambling a preamble sequence based at least in part on the identification information. The identification information may include a user equipment (UE) identification or a data identification associated with a category of data carried in a body portion of the transmission burst.

Additionally or alternatively, the UE preamble module 850 may be used, for example, to determine identification information carried in the preamble of a received transmission burst. The identification information may include a cell identification or a group identification associated with a group of cells. Additionally or alternatively, the identification information may include a data identification associated with a category of data being received, such as a category of data carried in the body portion of the received transmission burst or a category of data carried in another portion or a transmission.

The UE preamble module 850 may determine whether the cell identification matches a serving cell identification, or if the group identification associated with a group of cells matches the group identification associated with a group of serving cells. If the cell identification does not match a serving cell identification, and/or if the group identification associated with a group of cells does not match the group identification associated with a group of serving cells, then the UE preamble module 850 may ignore a body portion of the received transmission burst. Additionally or alternatively, the UE preamble module 850 may determine an interference measurement of the received transmission burst if the cell identification does not match a serving cell identification, and/or if the group identification associated with a group of cells does not match the group identification associated with a group of serving cells.

Figure 9:
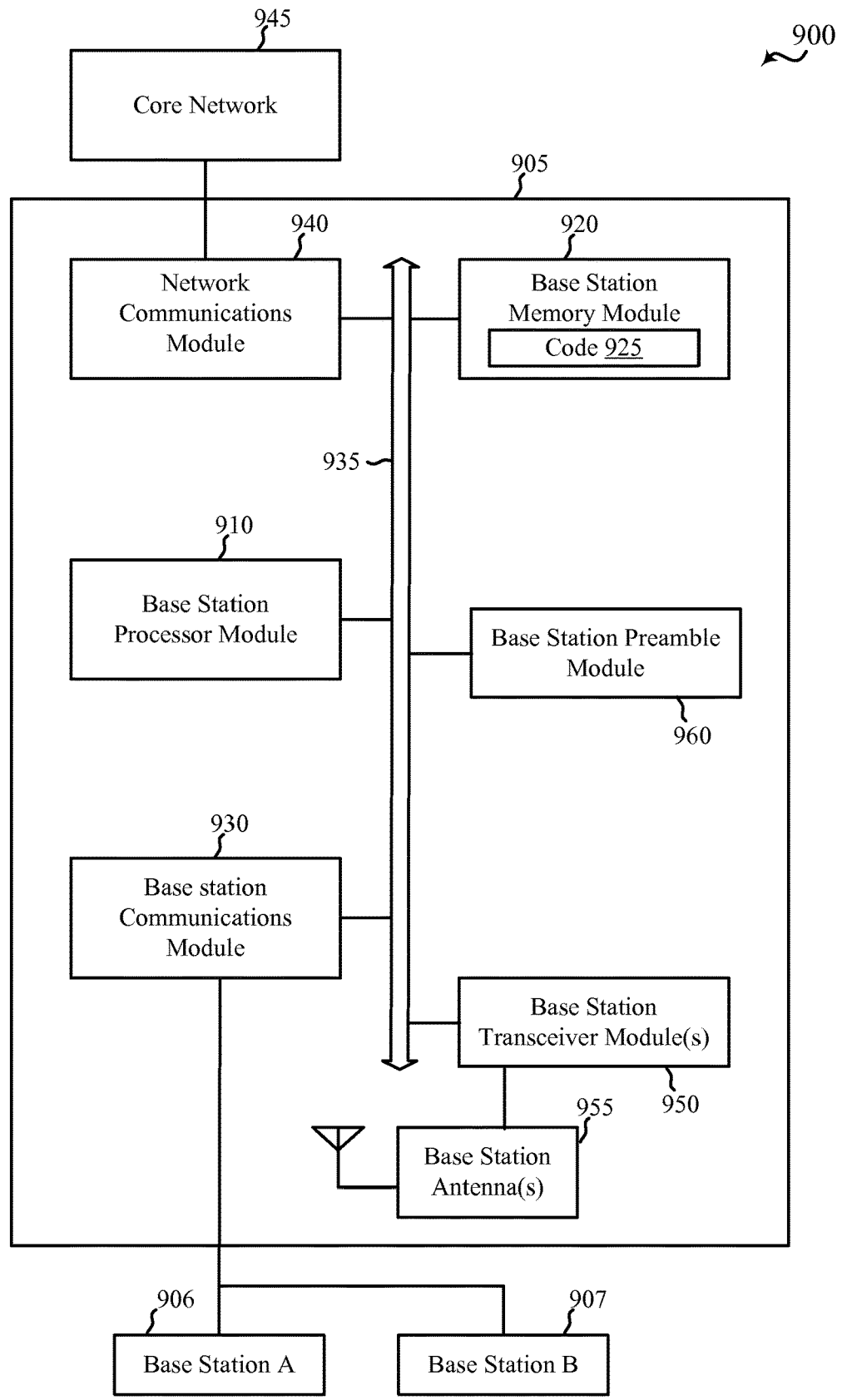
FIG. 9 shows a block diagram of a base station for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of one or more aspects of the base station 105 or 205 described with reference to FIGS. 1 and 2, or aspects of the apparatus 605 or 705 described with reference to FIGS. 6 and 7. The base station 905 may be configured to implement or facilitate at least some of the base station features and functions described with reference to FIG. 1, 2, 3, 4, 5, 6, or 7.

The base station 905 may include a base station processor module 910, a base station memory module 920, at least one base station transceiver module (represented by base station transceiver module(s) 950), at least one base station antenna (represented by base station antenna(s) 955), or a base station preamble module 960. The base station 905 may include one or more of a base station communications module 930 or a network communications module 940. Each of these components may be in communication with each other, directly or indirectly, over one or more buses 935.

The base station memory module 920 may include RAM or ROM. The base station memory module 920 may store computer-readable, computer-executable code 925 containing instructions that are configured to, when executed, cause the base station processor module 910 to perform various functions described herein related to wireless communication, including the transmission or reception of a preamble. Alternatively, the code 925 may not be directly executable by the base station processor module 910 but be configured to cause the base station 905 (e.g., when compiled and executed) to perform various of the functions described herein.

The base station processor module 910 may include an intelligent hardware device, e.g., a CPU, a microcontroller, an ASIC, etc. The base station processor module 910 may process information received through the base station transceiver module(s) 950, the base station communications module 930, or the network communications module 940. The base station processor module 910 may process information to be sent to the transceiver module(s) 950 for transmission through the antenna(s) 955, to the base station communications module 930, for transmission to one or more other base stations 906 and 907, or to the network communications module 940 for transmission to a core network 945, which may be an example of one or more aspects of the core network 130 described with reference to FIG. 1. The base station processor module 910 may handle, alone or in connection with the base station transceiver module(s) 950, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use). The base station processor module 910 may handle, alone or in connection with the base station transceiver module(s) 950, various aspects of communicating using an ultra-low latency subframe.

The base station transceiver module(s) 950 may include a modem configured to modulate packets and provide the modulated packets to the base station antenna(s) 955 for transmission, and to demodulate packets received from the base station antenna(s) 955. The base station transceiver module(s) 950 may, in some examples, be implemented as one or more base station transmitter modules and one or more separate base station receiver modules. The base station transceiver module(s) 950 may support communications in the licensed radio frequency spectrum band or the unlicensed radio frequency spectrum band. The base station transceiver module(s) 950 may be configured to communicate bi-directionally, via the antenna(s) 955, with one or more UEs or apparatuses, such as one or more of the UEs 115, 215, or 815 described with reference to FIGS. 1, 2, and 8, or one or more of the apparatuses 605 or 705 described with reference to FIGS. 6 and 7. The base station 905 may, for example, include multiple base station antennas 955 (e.g., an antenna array). The base station 905 may communicate with the core network 945 through the network communications module 940. The base station 905 may communicate with other base stations, such as the base stations 906 and 907, using the base station communications module 930.

The base station preamble module 960 may be configured to perform or control some or all of the features or functions described with reference to FIG. 1, 2, 3, 4, 5, 6, or 7, related to transmission or reception of a preamble. The base station preamble module 960 may be used, for example, to generate a preamble for a transmission burst. The preamble may include identification information associated with the base station 905. In some examples, the base station preamble module 960 may generate the preamble by scrambling a preamble sequence based at least in part on the identification information. The identification information may include a cell identification, a group identification associated with a group of cells, or a data identification associated with a category of data carried in a body portion of the transmission burst.

Additionally or alternately, the base station preamble module 960 may be used, for example, to determine identification information carried in the preamble of a received transmission burst. The identification information may include, for example, a UE identification. Additionally or alternately, the identification information may include, for example, a data identification associated with a category of data being received, such as a category of data carried in the body portion of the received transmission burst or a category of data carried in another portion of a transmission.

The base station preamble module 960 may determine whether the received UE identification matches the identification of a UE being served by the base station 905. If the UE identification does not match the identification of a UE being served by the base station 905, then the base station preamble module 960 may ignore a body portion of the received transmission burst. Additionally or alternately, the preamble module may determine an interference measurement of the received transmission burst if the UE identification does not match the identification of a UE being served by the base station 905.

Figure 10:
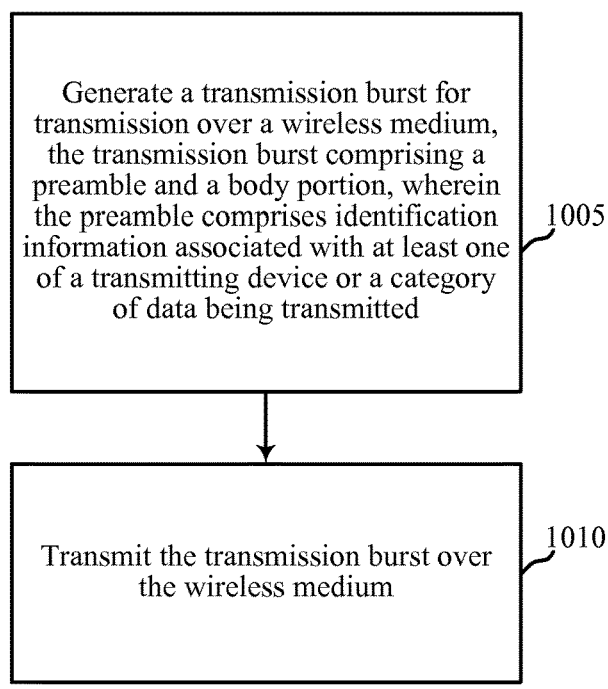
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the UEs 115, 215, or 815 described with reference to FIGS. 1, 2, and 8, aspects of one or more of the base stations 105, 205, or 905 described with reference to FIGS. 1, 2, and 9, or aspects of one or more of the apparatuses 605 or 705 described with reference to FIGS. 6 and 7. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 1005, the method 1000 may include generating a transmission burst for transmission over a wireless medium. The transmission burst may include a preamble and a body portion, and the preamble may include identification information associated with at least one of a transmitting device or a category of data being transmitted, such as a category of data in the body portion or a category of data in some other portion of a transmission. The identification information may include a cell identification, a group identification associated with a group of cells, a user equipment (UE) identification, or a data identification associated with a category of data carried in the body portion of the transmission burst. The operation(s) at block 1005 may be performed using the preamble module 615, 715, 850, or 960 described with reference to FIGS. 6, 7, 8, and 9.

At block 1010, the method 1000 may include transmitting the transmission burst over the wireless medium. In some examples, a time or frequency location for transmitting the preamble may be determined based at least in part on the identification information. The time or frequency location may include regularly spaced subcarriers. The time or frequency location may be determined by performing a modulo operation on the identification information and determining a subcarrier index offset based at least in part on the modulo operation. For example, the subcarrier index offset may be determined by a cell ID modulo 3. The subcarriers for transmitting the preamble may then be determined based at least in part on the subcarrier index offset. In some examples, the transmission burst may be transmitted over an unlicensed radio frequency spectrum band. The transmission burst may include an ultra-low latency transmission or a time division duplex (TDD) transmission. The operation(s) at block 1010 may be performed using the transmitter module 620 or 720 described with reference to FIGS. 6 and 7, or the transceiver module(s) 830 or 950 described with reference to FIGS. 8 and 9.

Thus, the method 1000 may provide for wireless communication. It should be noted that the method 1000 is just one implementation and that the operations of the method 1000 may be rearranged or otherwise modified such that other implementations are possible.

Figure 11:
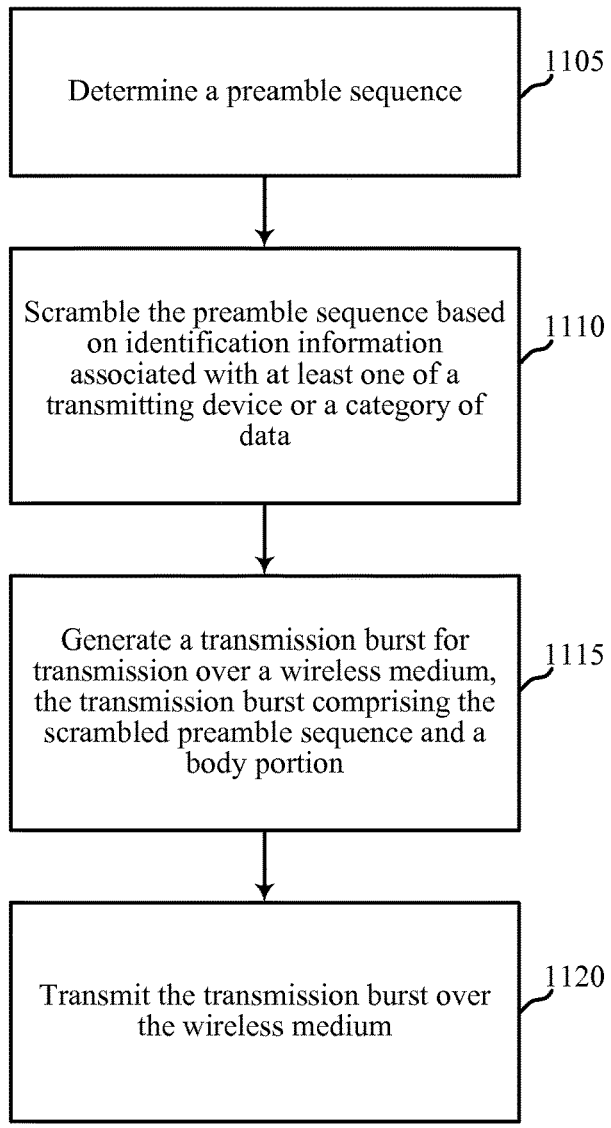
FIG. 11 is a flow chart illustrating another example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the UEs 115, 215, or 815 described with reference to FIGS. 1, 2, and 8, aspects of one or more of the base stations 105, 205, or 905 described with reference to FIGS. 1, 2, and 9, or aspects of one or more of the apparatuses 605 or 705 described with reference to FIGS. 6 and 7. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 1105, the method 1100 may include determining a preamble sequence. The operation(s) at block 1105 may be performed using the preamble module 615, 715, 850, or 960 described with reference to FIGS. 6, 7, 8, and 9.

At block 1110, the method 1100 may include scrambling the preamble sequence based at least in part on identification information associated with at least one of a transmitting device or a category of data. The operation(s) at block 1110 may be performed using the preamble module 615, 715, 850, or 960 described with reference to FIGS. 6, 7, 8, and 9.

At block 1115, the method 1100 may include generating a transmission burst for transmission over a wireless medium. The transmission burst may include the scrambled preamble sequence and a body portion. The operation(s) at block 1115 may be performed using the preamble module 615, 715, 850, or 960 described with reference to FIGS. 6, 7, 8, and 9.

At block 1120, the method 1100 may include transmitting the transmission burst over the wireless medium. The operation(s) at block 1120 may be performed using the transmitter module 620 or 720 described with reference to FIGS. 6 and 7, or the transceiver module(s) 830 or 950 described with reference to FIGS. 8 and 9.

Thus, the method 1100 may provide for wireless communication. It should be noted that the method 1100 is just one implementation and that the operations of the method 1100 may be rearranged or otherwise modified such that other implementations are possible.

Figure 12:
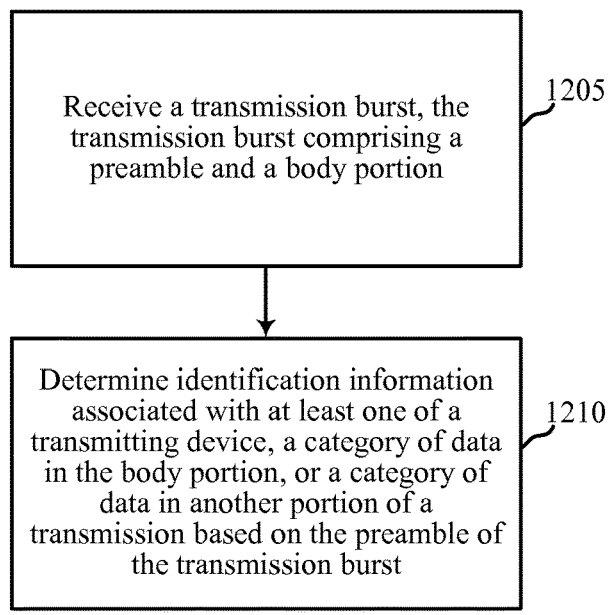
FIG. 12 is a flow chart illustrating yet another example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the UEs 115, 215, or 815 described with reference to FIGS. 1, 2, and 8, aspects of one or more of the base stations 105, 205, or 905 described with reference to FIGS. 1, 2, and 9, or aspects of one or more of the apparatuses 605 or 705 described with reference to FIGS. 6 and 7. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 1205, the method 1200 may include receiving a transmission burst. The transmission burst may include a preamble and a body portion. In some examples, a channel estimation may be determined based at least in part on the received preamble. In some examples, the beginning of the body portion of the transmission burst may be determined based at least in part on the received preamble. The transmission burst may be received over an unlicensed radio frequency spectrum band. The transmission burst may include an ultra-low latency communication or a time division duplex (TDD) communication. The operation(s) at block 1205 may be performed using the receiver module 610 or 710 described with reference to FIGS. 6 and 7, or the transceiver module(s) 830 or 950 described with reference to FIGS. 8 and 9.

At block 1210, the method 1200 may include determining identification information associated with at least one of a transmitting device or a category of data being transmitted, such as a category of data in the body portion or a category of data in another portion of a transmission, based at least in part on the preamble of the transmission burst. The identification information may include cell identification, a group identification associated with a group of cells, a user equipment (UE) identification, or a data identification associated with a category of data carried in the body portion of the transmission burst. The operation(s) at block 1210 may be performed using the preamble module 615, 715, 850, or 960 described with reference to FIGS. 6, 7, 8, and 9.

Thus, the method 1200 may provide for wireless communication. It should be noted that the method 1200 is just one implementation and that the operations of the method 1200 may be rearranged or otherwise modified such that other implementations are possible.

Figure 13:
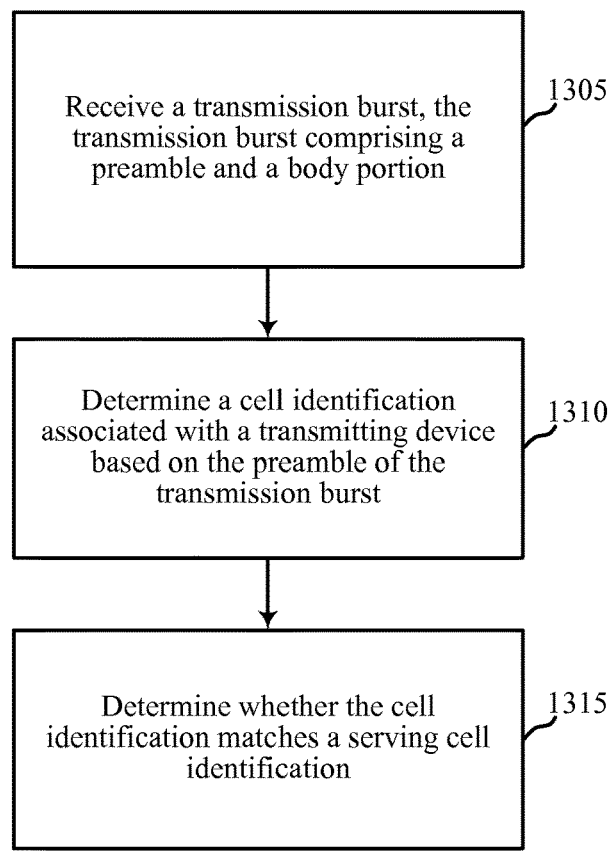
FIG. 13 is a flow chart illustrating still another example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the UEs 115, 215, or 815 described with reference to FIGS. 1, 2, and 8, aspects of one or more of the base stations 105, 205, or 905 described with reference to FIGS. 1, 2, and 9, or aspects of one or more of the apparatuses 605 or 705 described with reference to FIGS. 6 and 7. In some examples, a base station, UE, or apparatus may execute one or more sets of codes to control the functional elements of the base station, UE, or apparatus to perform the functions described below. Additionally or alternatively, the base station, UE, or apparatus may perform one or more of the functions described below using special-purpose hardware.

At block 1305, the method 1300 may include receiving a transmission burst. The transmission burst may include a preamble and a body portion. The operation(s) at block 1305 may be performed using the receiver module 610 or 710 described with reference to FIGS. 6 and 7, or the transceiver module(s) 830 or 950 described with reference to FIGS. 8 and 9.

At block 1310, the method 1300 may include determining a cell identification, or a group identification associated with a group of cells, associated with one or more transmitting devices based at least in part on the preamble of the transmission burst. The operation(s) at block 1310 may be performed using the preamble module 615, 715, 850, or 960 described with reference to FIGS. 6, 7, 8, and 9.

At block 1315, the method 1300 may include determining whether the cell identification matches a serving cell identification, or if the group identification associated with a group of cells matches a group identification associated with a group of serving cells. In some examples, if the cell identification does not match a serving cell identification, and/or if the group identification associated with a group of cells does not match the group identification associated with a group of serving cells, then the body portion of the transmission burst may be ignored. In some examples, if the cell identification does not match a serving cell identification, and/or if the group identification associated with a group of cells does not match the group identification associated with a group of serving cells, then an interference measurement of the transmission burst may be determined. The interference measurement may be transmitted to a serving cell associated with the serving cell identification, which in some examples may be transmitted as part of a channel quality indicator (CQI) Report. In some examples, the transmission burst may be canceled if the cell identification does not match a serving cell identification, and/or if the group identification associated with a group of cells does not match the group identification associated with a group of serving cells. The operation(s) at block 1315 may be performed using the preamble module 615, 715, 850, or 960 described with reference to FIGS. 6, 7, 8, and 9.

Thus, the method 1300 may provide for wireless communication. It should be noted that the method 1300 is just one implementation and that the operations of the method 1300 may be rearranged or otherwise modified such that other implementations are possible.

In some examples, aspects from two or more of the methods 1000, 1100, 1200, and/or 1300 may be combined. It should be noted that the methods 1000, 1100, 1200, and 1300 are just example implementations, and that the operations of the methods 1000, 1100, 1200, and 1300 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. Additionally or alternately, a processor may be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving a transmission burst, the transmission burst comprising a preamble and a body portion, wherein the preamble signals a start of the transmission burst and comprises identification information indicating: a transmitting device, a category of data being transmitted, and whether the transmission is scheduled or non-scheduled;
   determining identification information associated with a transmitting device and at least one of a category of data in the body portion or a category of data in another portion of a transmission based at least in part on the preamble of the transmission burst;
   determining to ignore a portion of the transmission based at least in part on the identification information; and
   ignoring the portion of the transmission based at least in part on determining to ignore the portion of the transmission.

2. The method of claim 1, wherein the identification information comprises at least one of a cell identification, a group identification associated with a group of cells, a user equipment (UE) identification, a data identification associated with a category of data carried in the body portion of the transmission burst, or a data identification associated with a category of data carried in another portion of a transmission.

3. The method of claim 2, further comprising:
   determining an interference measurement of the transmission burst based at least in part on the identification information; and
   transmitting the interference measurement to a serving cell associated with the identification information.

4. The method of claim 2, further comprising:
   determining an interference measurement of the transmission burst based at least in part on the identification information; and
   canceling the transmission burst based at least in part on the interference measurement.

5. The method of claim 1, further comprising:
   determining a channel estimation based at least in part on the received preamble.

6. The method of claim 1, further comprising:
   determining the beginning of the body portion of the transmission burst based at least in part on the received preamble.

7. The method of claim 1, wherein the transmission burst is received over an unlicensed radio frequency spectrum band.

8. The method of claim 1, wherein the transmission burst comprises a time division duplex (TDD) communication.

9. An apparatus for wireless communication, comprising:
   a processor; and
   memory coupled to the processor, wherein the processor is configured to:
      receive a transmission burst, the transmission burst comprising a preamble and a body portion, wherein the preamble signals a start of the transmission burst and comprises identification information indicating: a transmitting device, a category of data being transmitted, and whether the transmission is scheduled or non-scheduled;
      determine identification information associated with a transmitting device and at least one of: a category of data in the body portion or a category of data in another portion of a transmission based at least in part on the preamble of the transmission burst;
      determine to ignore a portion of the transmission based at least in part on the identification information; and
      ignore the portion of the transmission based at least in part on determining to ignore the portion of the transmission.

10. The apparatus of claim 9, wherein the identification information comprises at least one of a cell identification, a group identification associated with a group of cells, a user equipment identification, a data identification associated with a category of data carried in the body portion of the transmission burst, or a data identification associated with a category of data carried in another portion of a transmission.

11. The apparatus of claim 10, wherein the processor is further configured to:
   determine an interference measurement of the transmission burst based at least in part on the identification information; and
   transmit the interference measurement to a serving cell associated with the identification information.

12. The apparatus of claim 10, wherein the processor is further configured to:
   determine an interference measurement of the transmission burst; and
   cancel the transmission burst based at least in part on the interference measurement.

13. The apparatus of claim 9, wherein the processor is further configured to:
   determine a channel estimation based at least in part on the received preamble.

14. The apparatus of claim 9, wherein the processor is further configured to:
   determine the beginning of the body portion of the transmission burst based at least in part on the received preamble.

15. The apparatus of claim 9, wherein the transmission burst comprises a time division duplex (TDD) communication.

* * * * *